United States Patent
Ash et al.

[11] 4,057,319
[45] Nov. 8, 1977

[54] OPTICAL SYSTEM USING A HOLOGRAM COUPLER

[75] Inventors: Eric Albert Ash; Oliverio Delfim Dias Soares, both of London, England

[73] Assignee: National Research Development Corporation, London, England

[21] Appl. No.: 673,995

[22] Filed: Apr. 5, 1976

[51] Int. Cl.² .................. G02B 5/16; G02B 27/00
[52] U.S. Cl. ........................ 350/96 C; 350/3.5; 350/96 WG
[58] Field of Search ............... 350/96 C, 96 WG, 3.5

[56] References Cited

U.S. PATENT DOCUMENTS

| | | | |
|---|---|---|---|
| 3,666,345 | 5/1972 | Maslowski | 350/96 C |
| 3,809,455 | 5/1974 | Pekau et al. | 350/96 C |
| 3,975,082 | 8/1976 | Winzer | 350/96 C |

OTHER PUBLICATIONS

Sincerbox "Formation of Optical Elements by Holography", IBM Tech Disc. Bulletin, vol. 10, No. 3, Aug. 1967.
Nishihara et al., "Holocoupler: A Novel Coupler for Optical Circuits" IEEE Journal of Quantum Electronics, Sept. 1975.

*Primary Examiner*—John K. Corbin
*Assistant Examiner*—Stewart Levy
*Attorney, Agent, or Firm*—Cushman, Darby & Cushman

[57] ABSTRACT

An optical system in which individual connections are made involving the passage of light between a specific device in one array of optical devices and a specific device in another array of optical devices includes a phase hologram plate of the transmission type fixed relative to each array.

14 Claims, 5 Drawing Figures

OPTICAL SYSTEM USING A HOLOGRAM COUPLER

This invention relates to optical connectors for connecting optical devices.

Recent progress in quantum electronics and related optical devices has led to the possibility that future communications and computer systems will be optically based using, for example, optical dieletric waveguides such as optical fibres. In such circumstances, a requirement may arise to couple arrays of such fibres to arrays of optical devices such as light sources, light detectors, and other fibres. While the coupling of a single optical fibre to another fibre is relatively simple, connection of a bundle of fibres having an irregular arrangement to an optical array is more difficult. Obvious requirements are low optical loss and low cross talk. Similarly, arrays of devices such as light sources may be required to be coupled to arrays of devices such as light detectors without an intermediate fibre array.

According to the invention, an optical connector consists of an array of optical devices; a multiple exposure phase hologram plate having formed therein a series of phase holograms all of the transmission type; and support means for supporting the plate in a fixed position relative to the array; the phase holograms having forms such that if the phase hologram plate is illuminated by a beam of light divergent from a point coinciding with one of the optical devices, then at least one phase hologram will transmit the light in plane-wave form. The array of optical devices may, for example, consist of the ends of a random or ordered bundle of optical fibres, or may be an array of light sources, light detectors, light modulators or light filters, or combinations thereof.

Also according to the invention an optical connector consists of an array of optical devices; a multiple exposure phase hologram plate having formed therein a series of phase holograms all of the transmission type; and support means for supporting the plate in a fixed position relative to the array; the phase holograms having been formed, in turn, in a plate of a material capable of forming phase holograms placed in said fixed position, by irradiating the plate with coherent light consisting of at lease one beam diverging from a point coinciding with at least one of said optical devices, and at least one of a series of reference beams having plane wavefronts whose axes respectively have different orientations with respect to the plate.

Further according to the invention a method of making a multiple exposure phase hologram plate for use in an optical connector, including the steps of relatively fixing in position an array of optical devices and a plate of a material capable of forming phase holograms, and forming in said plate in turn a series of phase holograms, each phase hologram being formed by irradiating the plate with coherent light consisting of at least one beam passing between at least one of the devices in the array and the plate, and at least one of a series of reference beams whose axes respectively have different orientations with respect to the plate, the reference beams having plane wavefronts and being incident on the plate on the same side as said at least one beam, whereby the simultaneous passage of at least two beams produces in the plate an interference pattern which is recorded by the plate to form a phase hologram of the transmission type.

The invention will now be described by way of example with reference to the accompanying drawings in which.

Figure 1:
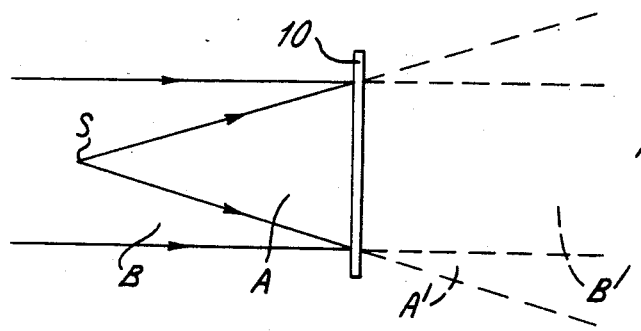
FIG. 1 illustrates the principle of a phase hologram of the transmission type.

In FIG. 1 a plate of holographic medium 10 is illuminated by a beam of light A divergent from a point S and by a beam B having a plane wavefront. The beam A and B are simultaneously incident on the same face of the plate and are coherent so that interference fringes form, and the fringes occurring within the plate 10 may be translated into changes in the refractive index of the medium. The plate is then processed so that the changes in refractive index are made permanent; the processed plate now comprises a phase hologram of the transmission type. If the plate is replaced in position and illuminated only by the divergent beam A, the hologram will transmit light as a parallel beam B', which is the continuation of plane beam B on the other side of the plate. If the plate is illuminated only by the plane beam B, the hologram will transmit light as a beam A' apparently divergent from S. Conversely, if the plate is illuminated by beams A' or B' travelling from right to left in the figure, the hologram will transmit the light respectively as a plane beam antiparallel to beam B and a beam convergent on S.

A phase hologram having the same properties could be made by illuminating the plate simultaneously with a convergent beam A' and a reference beam B' both travelling from right to left.

Figure 2:
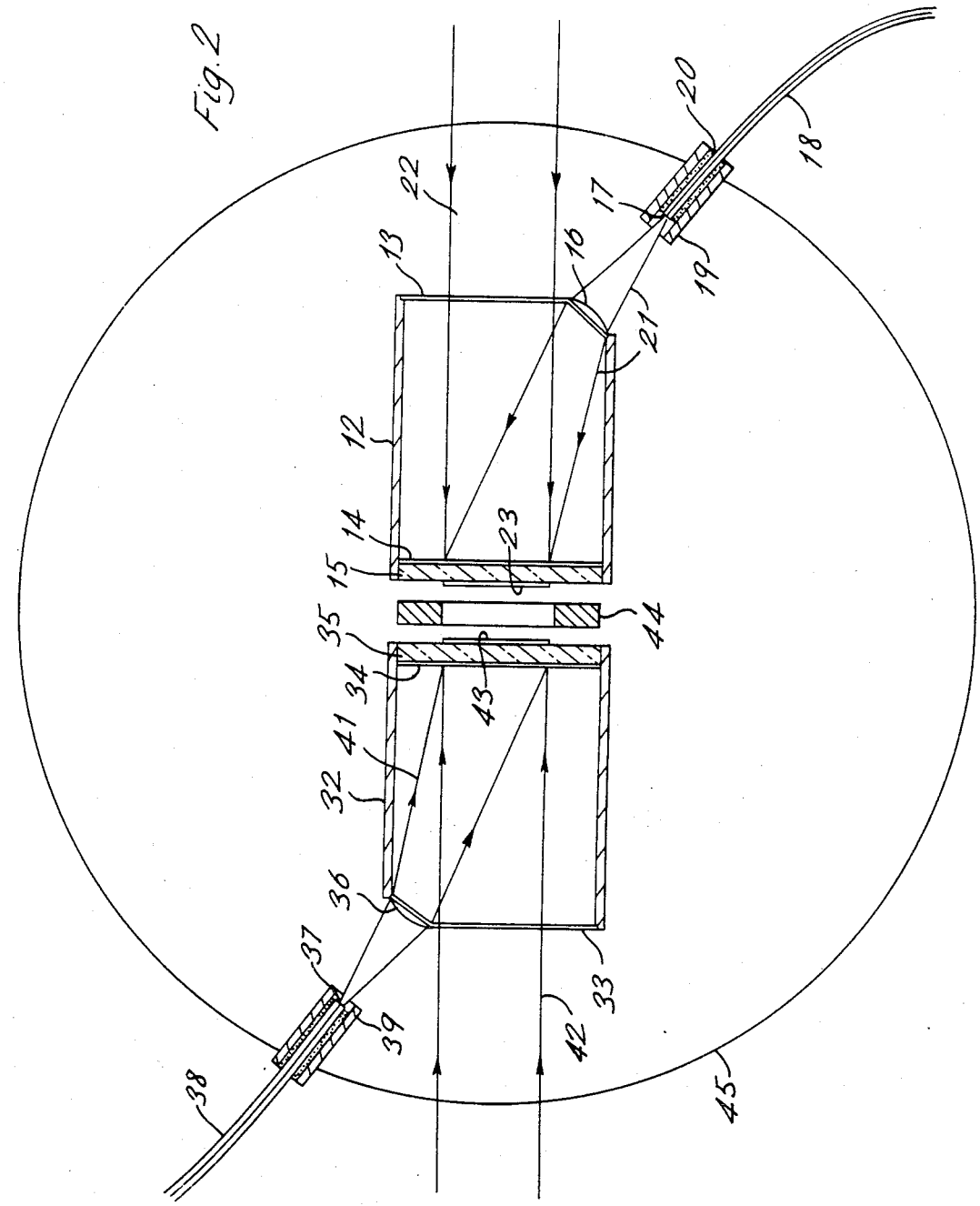
FIG. 2 illustrates schematically an arrangement for making multiple exposure phase hologram plates for optical systems according to the invention.

The same principle is used to make simultaneously two multiple exposure phase hologram plates as shown in FIG. 2. A tubular support 12 of opaque material of low coefficient of thermal expansion supports an optical flat 13 at one end and a glass sheet 15 carrying a plate of holographic recording medium 14 at the other end. The plate 14 and sheet 15 may, for example, be a plate of Agfa Uglass (Registered Trade Mark) 10E75. Alternatively the holographic recording medium may be lithium niobate or a photopolymer.

A lens system 16 is placed across a corner between the support 12 and the optical flat 13. The lens system need not be of high quality but must have an anti-reflection coating. Adjacent the lens system outside the support 12 is one end 17 of a bundle of optical fibres 18; the end is fixed in a constant aperture adaptor 19 by cement 20 and the arrangement is such that if one fibre in the bundle is illuminated at the en remote from the adaptor 19, a beam of light 21 diverg from the fibre at the end 17 and is refracted by the lens system to be incident on the plate of holographic medium 14. The adaptor 19 ensures that light divergent from the end of any fibre in the bundle will fully illuminate the same area of the plate.

The plate 14 is also illuminated through the optical flat 13 by a reference beam 22 which has a plane wavefront and which is coherent with beam 21 so that interference fringes are formed in the plate 14. The lens system is chosen so that the light from a fibre illuminates the same area of plate 14 as the reference beam. Conveniently, the beams may both be derived from a laser source (not shown). The glass sheet 15 is masked with a temporary anti-reflection and optical isolation coating 23 to prevent transmission of the beams or back reflection from the glass-air interface.

A similar arrangement of tubular support 32, an optical flat 33, a plate of holographic medium 34 carried by a sheet of optically flat glass 35, and a lens system 36 is arranged with the sheets of glass 15,35 adjacent and parallel and separated by very thin spacers 44 (shown exploded for clarity.) The end 37 of a bundle of optical fibres 38 is fixed in a constant aperture adaptor. The plate 34 is illuminated by light emerging from a fibre in bundle 38 and passing through the lens system 36. The plate is also illuminated by a plane reference beam 42 which is in the same plane as, but antiparallel to, the reference beam 22. The beams 22, 42 therefore have the same orientation but opposite directions of travel. The beams 41 and 42 are coherent with each other and with beams 21 and 22, and the sheet 35 is masked with anti-reflection and optical isolation coating 43. As an alternative to the anti-reflection coatings, a layer of dark-coloured liquid between plates 15 and 35 and matching their refracive index may be used. The adaptors 19, 39 are fixed rigidly to the respective tubular supports 12, 32 by means not shown.

While the phase holograms are being made the tubular supports are attached to a turntable 45 such as the rotatable plate of an interferometer. The sources of the plane reference beams 22,42 are fixed in position and are not rotatable with the turntable.

To make the holograms, one fibre in each bundle 18, 38 is illuminated at the end romote from the adaptors 19, 39 so that the plates 14, 34 are respectively illuminated by divergent beams 21, 41. The plane reference beams 22, 42 are simultaneously incident and the plates are exposed to the interference patterns for a time long enough to allow the holographic medium to be sensitised to the interference pattern. All of the illuminating beams are then cut off, the turntable is rotated through a known angle, (sufficient for there to be no ulterior crosstalk between fibres), a second fibre in each bundle is illuminated and the plane reference beams provided once more. The reference beams are incident on the plates 14 and 34 at a different angle due to rotation of the plates with the turntable, and a second set of interference fringes is formed in each of the plates. The plates are respectively exposed to interference patterns caused by a beam divergent from each fibre in turn in the bundle associated with the plate, and a plane reference beam, and the turntable is rotated between exposures. The coatings are removed from the plates 14, 34 and the plates are processed. The plane reference beams are no longer required.

The optical connection system comprising two optical connectors is now ready for use. If a fibre in bundle 18 is illuminated at the end remote from adaptor 19, light will pass in a divergent beam 21 to the phase hologram plate 14; the transmission hologram in the plate made by a beam from that fibre will transmit the divergent beam as a plane wave travelling as a continuation of the plane reference beam used to make that grating; the plane wave will pass to the phase hologram plate 34; the transmission hologram in plate 34 made by a plane reference beam travelling antiparallel to the plane wave now incident will transmit the light as a beam convergent on the end of a fibre in the bundle 38, i.e., on the fibre from which a beam diverged when that hologram in plate 34 was made. Similarly, a beam divergent from a fibre in bundle 38 will be transmitted and converge on a fibre in bundle 18. Thus individual connections can be made between each fibre in one bundle and a corresponding fibre in the other bundle; each connection can be made in either of the two possible directions; each plane wave transmitted between the phase hologram plates 13, 34 will be at an angle (or orientation) with respect to the plates which is characteristic of the individual connection.

In the above-described arrangement using an interferometer and a turntable, the orientation at which the reference beams are incident on the plates of holographic medium varies in two dimensions. Other arrangements are possible; e.g. the orientations may be spaced at equal angles around a cone, giving a variation in three dimensions.

In the above description, the phase hologram plates for two optical connectors for use together as an optical connection system were made at the same time; this is the easiest way to ensure that the plane reference beams used to make two connectors are colinear. However, it is not essential, Optical connectors each comprising an array of devices and a relatively fixed phase hologram plate can be made individually and any two such connectors can be joined to provide a connection system, provided the orientations of the plane reference beams used to make the holograms can be caused to coincide and that the holograms are prepared using light of the same wavelength. The distance between the phase hologram plates is not critical; the only critical parameter is the tilt angle, i.e., the plate must be parallel.

Figure 3:
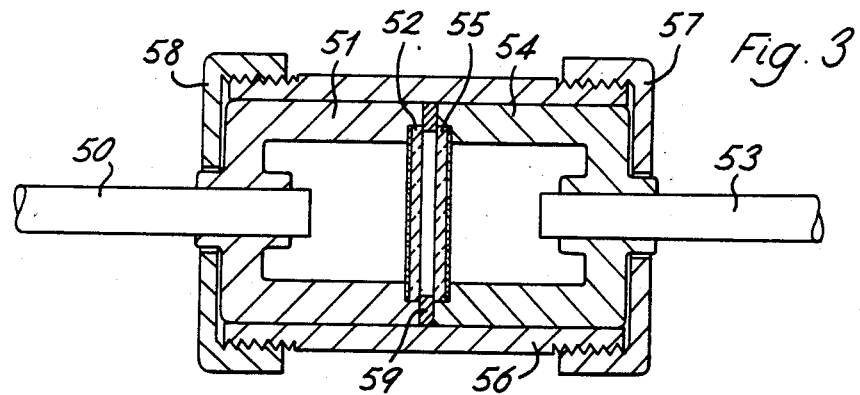
FIG. 3 illustrates in schematic section an optical connection system for field use.

FIG. 3 illustrates in section a type of optical connection system intended to be made in separate halves, and joined in "field use". A first bundle of optical fibres 50 is fixed at one end in a generally tubular support 51 which also supports a phase hologram plate 52. A second bundle of optical fibres 53 is fixed at one end in a similar supprt 54 which supports a phase hologram plate 55. The supports are arranged to be a push fit in a cylindrical case 56 and are held in position by screw caps 57, 58. Between the supports is a spacer 59, such as an annular sheet of plastics material, which spaces the supports apart by a very small distance with the phase hologram plates adjacent and parallel to a high degree of accuracy. In this arrangement the plates are self-aligning. The supports and case also have co-operating means, not shown, to prevent relative rotation.

The phase hologram plate 52 is made using a series of plane reference beams each incident on the plate at a different orientation through an optical flat (not shown in the section) in the wall of the support 51. The plate 55 is made using a series of plane reference beams incident at the same orientations with respect to the assembled apparatus, but in the antiparallel directions to, the reference beam incident on plate 52. The plates 52 and 55 are processed, The support 51 is placed in the case 56, the spacer 59 is inserted, then the support 54 is placed in the case with the orientations characteristic of the phase hologram plates in coincidence, the rotation-prevention means is operated, and caps 57, 58 are screwed on.

Although the invention has been described with reference to arrangements in which the arrays of devices are the ends of bundles of optical fibres, the invention may also be used to connect arrays of devices which comprise other types of optical device. When the devices comprise optical receptors the associated phase hologram plate may be made either by using a "dummy" array of photoemitters each emitter being in exactly the same position relative to the plate of holographic medium as that occupied by a receptor, or the array may be made by a beam convergent on each receptor in turn after passage through a plate of holographic medium.

Figure 4:
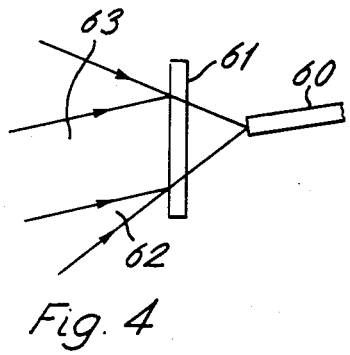
FIG. 4 shows in principle an alternative arrangement for making a multiple exposure phase hologram plate.

The latter arrangement is shown in FIG. 4 in which the ends of a bundle of holographic fibres 60 are illuminated, each in turn, through a plate of holographic medium 61 by a convergent beam 62 and a plane reference beam 63.

Figure 5:
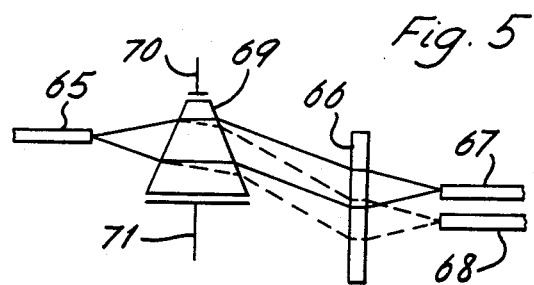
FIG. 5 shows in principle a switchable connection system.

It is possible to introduce the feature of switching, or modulation, into a holographic connection system according to the invention, for example by the arrangement shown in FIG. 5 in which a first fibre bundle 65 may be coupled through a multiple exposure holographic plate 66 to either of two fibre bundles 67, 68 by causing the beams from bundle 65 to pass first through an electro-optical deflector 69. The voltage applied to the electrodes 70, 71 of the deflector 69 determines which of the fibre bundles 67, 68 is illuminated.

If it is necessary to make an optical connection system secure from unauthorised use, then a random phase mask, such as a frosted glass plate, may be introduced into the system during its preparation. Meaningful connection can then only be made when that particular glass plate is in position. Alternatively the phase mask may be used to code the reference beams during recording of the holograms, in which case only connectors prepared using the same mask would provide coupling.

To overcome the problem of polarisation of a fibre in its basic mode, two holograms recorded with polarisation rotated by 90° may be provided. The system will then be able to operate efficiently, for example by transmission partly through each hologram if the plane of polarisation does not exactly coincide with one hologram.

The invention can also be used to selectively couple a chosen mode of a multimode fibre with no transmission in any other mode.

In addition to the systems described above, optical systems may be constructed in which there are a different number of devices in the arrays, and one device in one array is connected to two or more devices in the other array; similarly, in systems having the same number of devices in each array, a device in one array may be connected to two or more devices in the other array. Further, optical connections can be made in both directions; some of the devices in each array may be light emitters and some receptors; one fibre may even transmit in one direction at one wavelength and in the opposite direction at another wavelength. Connection may be made to a specific fibre at one wavelength and to another fibre at a different wavelength.

In any arrangement, the use of a plane wave passing between the phase hologram plates ensures that there are minimum optical aberrations, and eases the tolerance requirement for relative alignment.

We claim:

1. An optical connection system comprising:
   two arrays of optical devices;
   two multiple exposure phase hologram plates each having formed therein a series of phase holograms all of the transmission type; and
   support means for supporting said plates respectively in fixed positions relative to said two arrays; the holograms having forms such that individual optical connections each of which involves the passage of light between a specific device in one array and a specific device in the other array can be made respectively via a pair of holograms in each plate, there being associated with each phase hologram a direction of polarisation which differs by 90° between the holograms of a pair of holograms.

2. An optical connector consisting of an array of optical devices; a multiple exposure phase hologram plate having formed therein a series of phase holograms all of the transmission type; and support means for supporting the plate in a fixed position relative to the array; the phase holograms having been formed, in turn, in a plate of a material capable of forming phase holograms placed in said fixed position, by irradiating the plate with coherent light consisting of at least one beam diverging from a point coinciding with at least one of said optical devices and the plate and at least one of a series of reference beams having plane wavefronts whose axes respectively have different orientations with respect to the plate.

3. An optical connection system comprising:
   two arrays of optical devices;
   two multiple exposure phase hologram plates each having formed therein a series of phase holograms all of the transmission type; and
   support means for supporting said plates respectively in fixed positions relative to said two arrays, the holograms having forms such that individual optical connections each of which involves the passage of light between a specific device in one array and a specific device in the other array, are made respectively via one hologram in each plate.

4. An optical connection system according to claim 3 in which the phase hologram plates are arranged parallel to each other and the light passes between the plates in plane wave form.

5. An optical connector comprising:
   an array of optical devices;
   a multiple exposure phase hologram plate having formed therein a series of phase holograms all of the transmission type; and
   support means for supporting the plate in a fixed position relative to the array; there being associated with each phase hologram at least one of a series of plane waves, each plane wave of the series having its axial direction at a different orientation with respect to the phase hologram plate, and the phase holograms having forms such that if the phase hologram plate is illuminated by a beam of light divergent from a point coinciding with one of the optical devices, then at least one phase hologram will transmit the light in plane-wave form.

6. An optical connector according to claim 5 in which the array of optical devices consists of the ends of a bundle of optical fibers.

7. An optical connector according to claim 5, in which the number of phase holograms is equal to the number of devices in the array, and each hologram, when illuminated by a beam of light divergent from a specific device in the array, will transmit the light in the form of a plane wave whose axial direction is at a characteristic orientation with respect to the phase hologram plate, the orientation being different for each hologram.

8. An optical connection system consisting of two optical connectors according to claim 5, and support means for supporting the two connectors so that the two phase hologram plates are parallel and the orientations of the series of plane waves associated with each phase hologram plate are in coincidence, there being the same number of orientations in each series, whereby individual optical connections, each of which involves the passage of light between a specific device in one array and a specific device in the other array, can be made respectively via one hologram in each plate with the light passing between the plates in plane wave form.

9. An optical connection system according to claim 8 and further comprising an electro-optical device arranged between the arrays so that when an electric voltage is supplied to the electro-optical device, individual optical connections are made between a specific device in one array and a specific device in the other array, and when no voltage is supplied to the electro-optical device, individual optical connections are made between a specific device in the one array and a different specific device in the other array.

10. An optical connector according to claim 5, in which the number of phase holograms is equal to twice the number of devices in the array, and each pair of holograms, when illuminated by a beam of light divergent from a specific device in the array, will transmit the light in the form of a plane wave whose axial direction is at a characteristic orientation with respect to the phase hologram plate, the orientation being different for each pair of holograms, and there being associated with each phase hologram a direction of polarisation which differs by 90° between the holograms of a pair of holograms.

11. An optical connection system consisting of two optical connectors according to claim 10, and support means for supporting the two connectors so that the two phase hologram plates are parallel and the orientations of the series of plane waves associated with each phase hologram plate are in coincidence, there being the same number of orientations in each series, whereby individual optical connections each of which involves the passage of light between a specific device in one array and a specific device in the other array, can be made respectively via a pair of holograms in each plate, with the light passing between the plate in plane wave form.

12. A method of making a multiple exposure phase hologram plate for use in an optical connector, including the steps of:
relatively fixing in position an array of optical devices and a plate of a material capable of forming phase holograms; and
forming in said plate in turn a series of phase holograms, each phase hologram being formed by irradiating the plate with coherent light consisting of at least one beam passing between at least one of the devices in the array and the plate and at least one of a series of reference beams whose axes respectively have different orientations with respect to the plate, the reference beams having plane wavefronts and being incident on the plate on the same side as said at least one beam, whereby the simultaneous passage of at least two beams produces in the plate an interference pattern which is recorded by the plate to form a phase hologram of the transmission type.

13. A method of making an optical connector, including making a multiple exposure phase hologram plate by a method according to claim 12, and processing the plate to make permanent the record of the interference patterns.

14. A method of making a multiple exposure phase hologram plate according to claim 12 comprising forming in said plate in turn a series of phase holograms, each phase hologram being formed by at least one beam passing between at least one of the device in the array and the plate through polarising means, the direction of polarisation of the polarising means being rotated by 90° between formation of the first and second holograms of each pair of holograms.

* * * * *